United States Patent [19]
Ganek et al.

[11] Patent Number: 5,724,646
[45] Date of Patent: Mar. 3, 1998

[54] FIXED VIDEO-ON-DEMAND

[75] Inventors: Alan George Ganek, Chappaqua; Louis Paul Herzberg, Monsey; Antonio Ruiz, Yorktown Heights; Barry Edward Willner, Briarcliff Manor, all of N.Y.

[73] Assignee: International Business Machines Corporation, Armonk, N.Y.

[21] Appl. No.: 490,747

[22] Filed: Jun. 15, 1995

[51] Int. Cl.⁶ .............................. H04N 7/10; H04N 7/173
[52] U.S. Cl. .............................. 455/4.2; 348/7; 348/10
[58] Field of Search ........................ 348/7, 12, 13, 348/6; 455/4.2, 5.1, 3.1; H04N 7/10, 7/173

[56] References Cited

U.S. PATENT DOCUMENTS

| | | | |
|---|---|---|---|
| 3,786,424 | 1/1974 | McVoy et al. | 340/151 |
| 4,028,733 | 6/1977 | Ulicki | 360/10 |
| 4,077,006 | 2/1978 | Nicholson | 325/308 |
| 4,222,068 | 9/1980 | Thompson | 358/120 |
| 4,290,142 | 9/1981 | Schnee et al. | 455/3 |
| 4,408,345 | 10/1983 | Yashiro et al. | 455/3 |
| 4,461,032 | 7/1984 | Skerlos | 455/4 |
| 4,688,248 | 8/1987 | Tomizawa | 380/20 |
| 4,710,955 | 12/1987 | Kauffman | 380/10 |
| 4,995,078 | 2/1991 | Monslow et al. | 380/10 |
| 5,206,722 | 4/1993 | Kwan | 358/86 |
| 5,421,031 | 5/1995 | DeBey | 455/5.1 |
| 5,461,415 | 10/1995 | Wolf et al. | 348/7 |
| 5,512,934 | 4/1996 | Kochanski | 348/7 |
| 5,561,456 | 10/1996 | Yu | 348/7 |
| 5,586,264 | 12/1996 | Belknap et al. | 395/200.08 |

FOREIGN PATENT DOCUMENTS

PCT/AU90/00370 8/1990 WIPO .............. H04H 1/00

Primary Examiner—Glenton B. Burgess
Attorney, Agent, or Firm—Richard M. Ludwin; Louis P. Herzberg

[57] ABSTRACT

A system, method and apparatus for Video-on-demand (VOD) satisfying the desire of 'surfers'. The process entails a server operating in a standard Near-Video-on-demand (NVOD) mode, whereby it repeatedly transmits multiple copies of each program on separate channels. Each copy is delayed by a staggered time interval. The server also repeatedly transmits a beginning portion of each NVOD program of a duration up to the staggered time interval. The invention provides a way to fulfill a VOD user requests asynchronous with the start of a NVOD transmission but which still makes primary use of the NVOD transmission for that requestor. The invention further advantageously provides fixed asset utilization in a predictable manner.

32 Claims, 7 Drawing Sheets

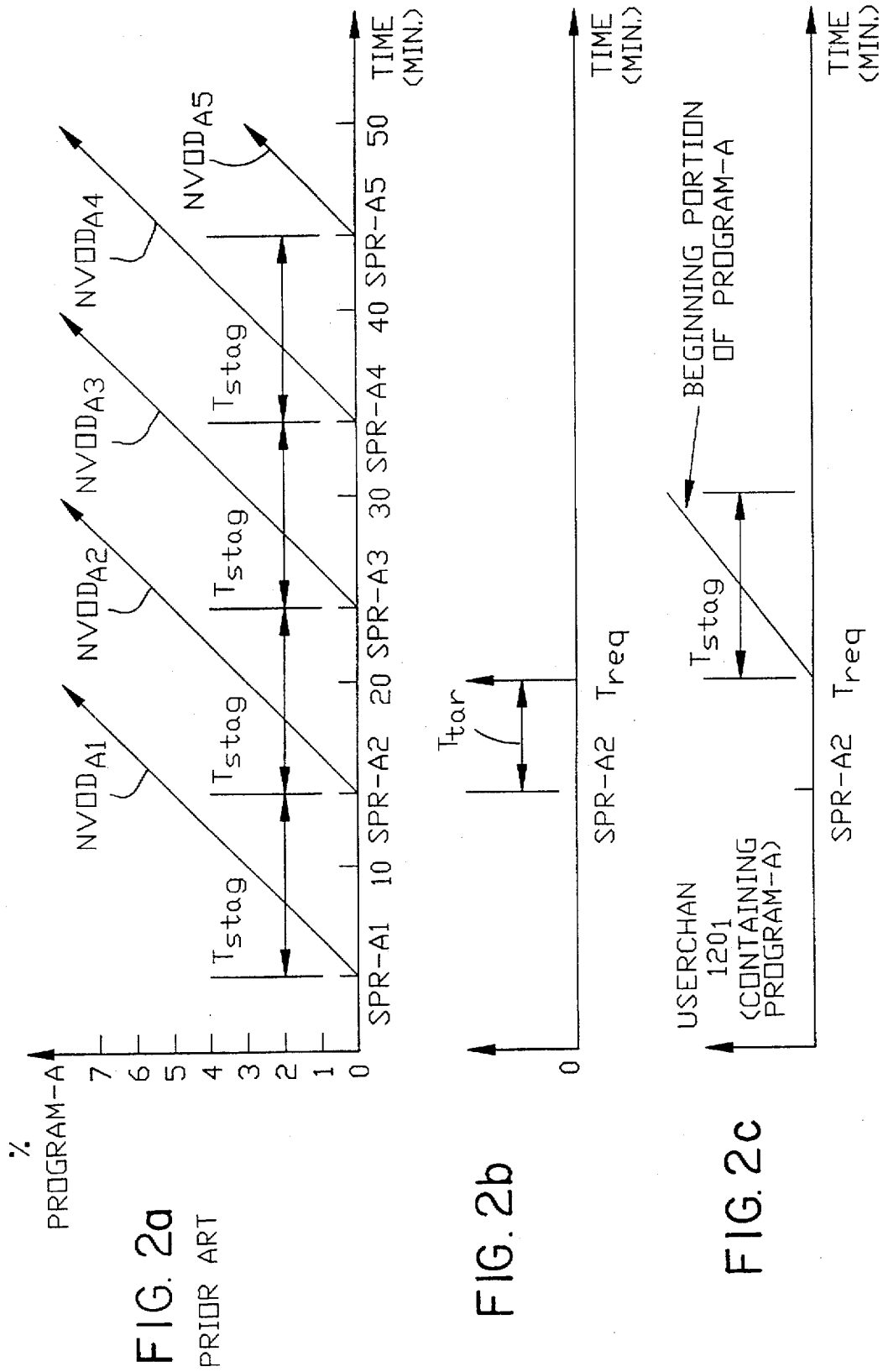

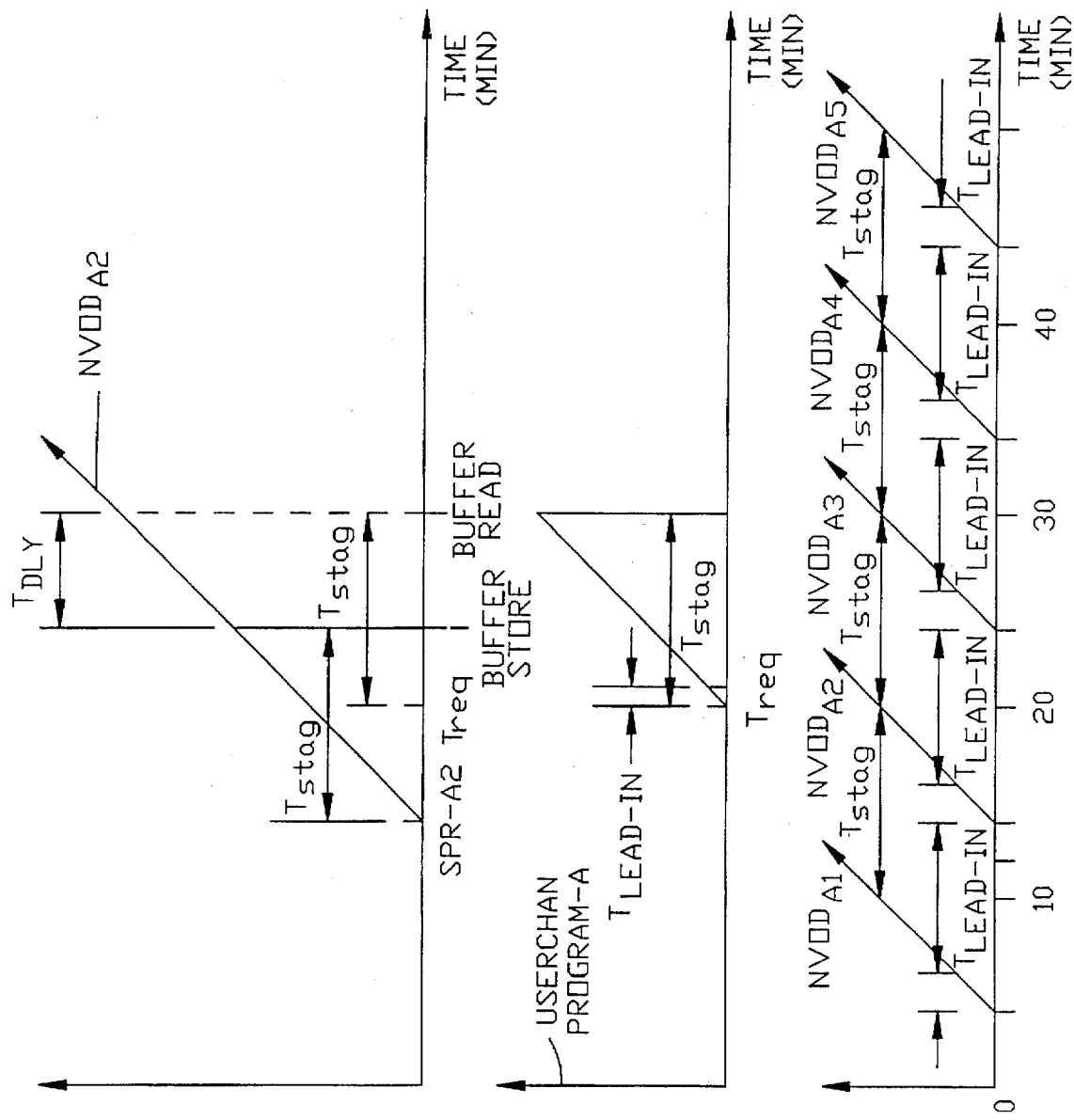

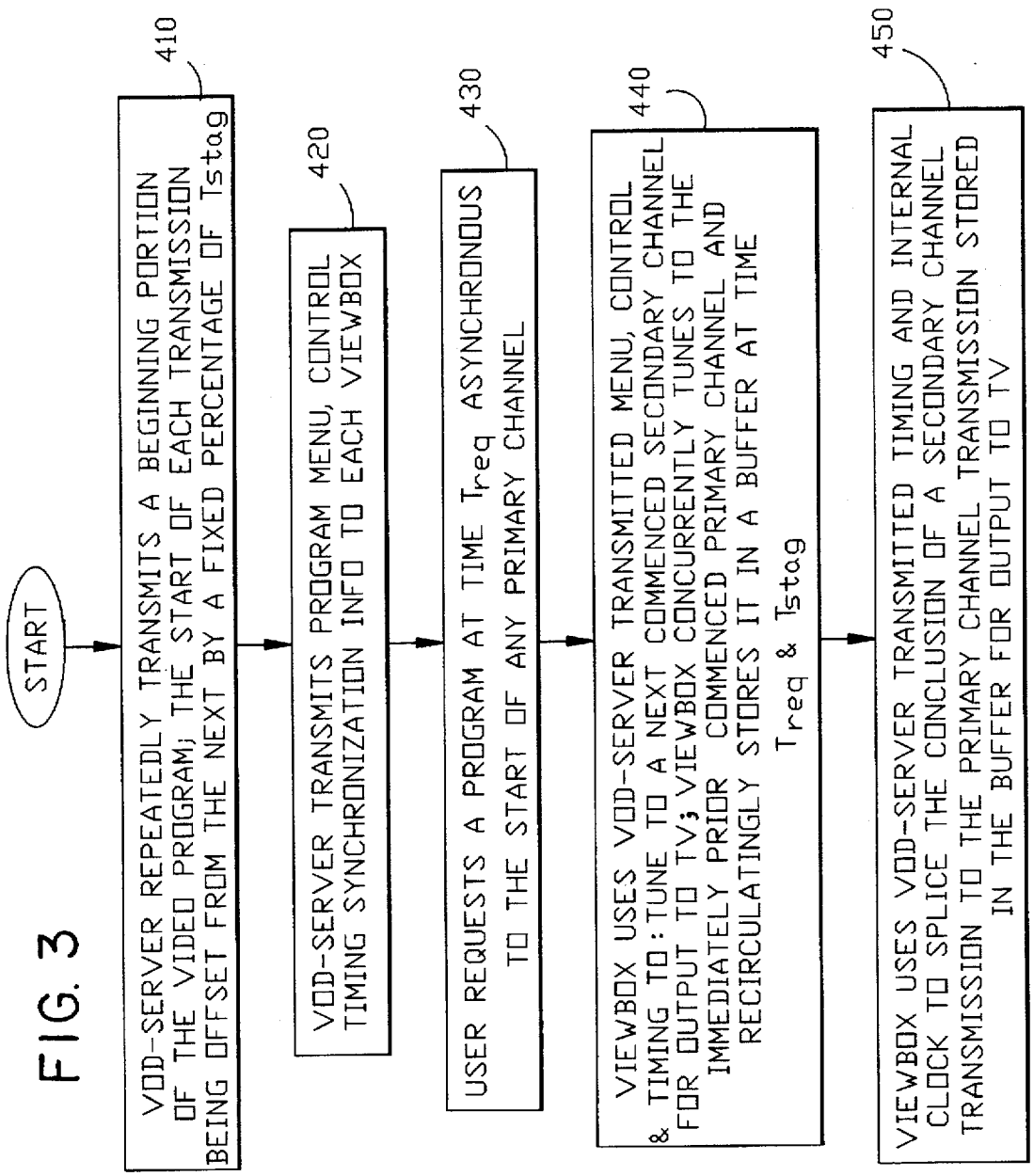

FIXED VIDEO-ON-DEMAND

The present application is related to co-pending application Ser. No.: 08/490,880, filed Jun. 15, 1995, entitled "HYBRID VIDEO ON DEMAND," by A. Ganek et al., (Attorney Docket Number YO995060). The present application and the aforementioned co-pending application are commonly assigned to International Business Machines Corporation, Armonk, N.Y.

FIELD OF THE INVENTION

This invention relates to a method and system for optimizing transmission efficiency and access capacity on a communications network; and particularly, although not exclusively, a process, system and apparatus for an efficient Video-on-Demand Multimedia Server System.

BACKGROUND OF THE INVENTION

Supplying Video-on-Demand, (VOD) can be expensive, inefficient and complex. Ideally, a server should quickly satisfy a users request for a video program. A costly alternative, especially on systems with many users, is to serve the video program on a separate channel for each user. A compromise solution is to provide Near-Video-On-Demand (NVOD), wherein a video program is repeatedly made available to users at a fixed staggered time interval. Although this reduces the number of channels required, user requests on such an NVOD system are subject to delays of up to the staggered time interval, which can be many minutes.

NVOD systems, for example, do not satisfy the needs of potential users such as 'Surfers' browsing through many channels to determine which video program to view. Surfers typically desire quick request satisfaction. With NVOD, this can theoretically be satisfied by utilizing a de minimus, e.g., one second, stagger interval. In the most simplistic way this would require the program to be simultaneously broadcast on a number of channels equal to the number of seconds of the program duration. For example, a program taking 2 hours (7,200 seconds, with the start of each channel staggered at a one second interval from another) would require 7,200 channels.

Moreover, the previously described mode of operation still allows variations in bandwidth asset utilization and could incur significant communication setup delays in order to satisfy a request transmitted to the server.

An efficient system, apparatus and method of providing Video-on-demand is needed which is easily adapted to current technology and which minimizes the need for server interaction and the attendant communication setup delays that result therefrom.

SUMMARY OF THE INVENTION

The Fixed Video-on-Demand (FVOD) process, system and apparatus of the present invention employs a server operating in NVOD mode, i.e., wherein multiple copies of each program are continuously sent on separate primary channels over a transmission line to a plurality of viewboxes. The start of each copy is offset by a staggered time interval. The server may also allocate separate secondary channels on which a beginning portion of each program of a duration equal to the staggered time interval is repeatedly transmitted over a transmission line to the plurality of viewboxes.

The process, system and apparatus of the present invention advantageously fulfills VOD user requests asynchronous with the start of an NVOD transmission, while maintaining primary use of the NVOD transmission for that requestor. The process, system and apparatus of the present invention further advantageously provides fixed asset utilization in a manner which minimizes possible communication setup delays which might otherwise be incurred.

According to a preferred embodiment of the present invention there is provided a method of providing video-on-demand of the type wherein a video program is repeatedly transmitted at a staggered time interval from a video-on-demand-server to a viewbox wherein the viewbox receives a request for the video program. The method comprises the steps of: repeatedly transmitting a beginning portion of the video program from the video-on-demand-server to the viewbox at a second staggered time interval; and at a receiver end: selecting a next commenced beginning portion of the video program for output by the viewbox, responsive to the request for the video program; selecting and storing an in-progress one of the repeated transmissions of the video program in a buffer associated with the viewbox, responsive to the request for the video program; and contiguously splicing the immediately previous transmission of the video program stored in the buffer to a conclusion of the beginning portion of the video program, for output by the viewbox.

According to another aspect of the present invention there is provided a video-on-demand system of a type wherein a video program is repeatedly transmitted at a staggered time interval from a video-on-demand-server to a viewbox via a transmission line communicatively coupled therebetween wherein the viewbox is responsive to the video-on-demand-server which receives a request for the video program. The system comprises: at a head end: the video-on-demand-server repeatedly transmitting a beginning portion of the video program from the video-on-demand-server to the viewbox; and at a receiver end: the viewbox having an input coupled to the transmission line and an output, the viewbox further including: a tuning circuit having a first output, a second output, an input and a control point wherein the first output is switchably coupled to the output of the viewbox, the input being coupled to the input of the viewbox; a remotely controlled switching device having a first output, a second output, and an input coupled to the input of the viewbox; the second output of the remotely controlled switching device being coupled to the control point of the tuning circuit for switchably and adjustably selecting both a next commenced one of the beginning portions repeatedly transmitted from the video-on-demand-server and an in-progress one of the repeated transmissions of the video program associated with a request for the video program; wherein the selected next commenced beginning portion of the video program is switchably coupled to the first output of the tuning circuit and the selected in-progress transmission of the video program is switchably coupled to the second output of the tuning circuit; and a buffer for storing the selected in-progress transmission of the video program; the buffer including a first input, a second input, and an output wherein the output of the buffer is switchably coupled to the output of the viewbox, the second input of the buffer is coupled to the second output of the tuning circuit, and the first input of the buffer is coupled to the first output of the switching device; wherein the remotely controlled switching device is further adapted for contiguously splicing the in-progress transmission of the video program stored in the buffer to the conclusion of the beginning portion of the video program.

BRIEF DESCRIPTION OF THE DRAWINGS

FIG. 2a is a general timing diagram of a prior art Near-video-on-demand system (NVOD) of a type wherein a video program is repeatedly made available at a 10 minute staggered time interval.

FIG. 2b is a timing diagram of an embodiment according to the present invention to be read concurrently with FIG. 2a, illustrating a request for a video program occurring at time $T_{req}$ that is asynchronous with the previous Near-video-on-demand (NVOD) program start and offset therefrom by an amount $T_{tar}$.

FIG. 2c is a timing diagram of an embodiment according to the present invention to be read concurrently with FIGS. 2a and 2b illustrating the serving of a separate user channel which contains a repeatedly transmitted beginning portion of the video program associated with the request.

FIG. 2d is a timing diagram of an embodiment according to the present invention to be read concurrently with FIGS. 2a, 2b and 2c illustrating the timing of storing to and reading from a buffer the immediately previous transmission of a video program, in response to a request.

FIG. 2e is a timing diagram of an embodiment according to the present invention to be read concurrently with FIGS. 2a, 2b, 2c and 2d illustrating the timing and method of using a 10% lead-in with each separate user channel.

FIG. 2f is a timing diagram of an embodiment according to the present invention to be read concurrently with FIGS. 2a, 2b, 2c, 2d, and 2e illustrating the timing and method of using a 10% lead-in with each video program repeatedly made available at a staggered time interval.

FIG. 3 is a flow chart of a preferred embodiment of a method of providing video-on-demand according to the present invention.

DESCRIPTION OF THE PREFERRED EMBODIMENTS

Figure 1:
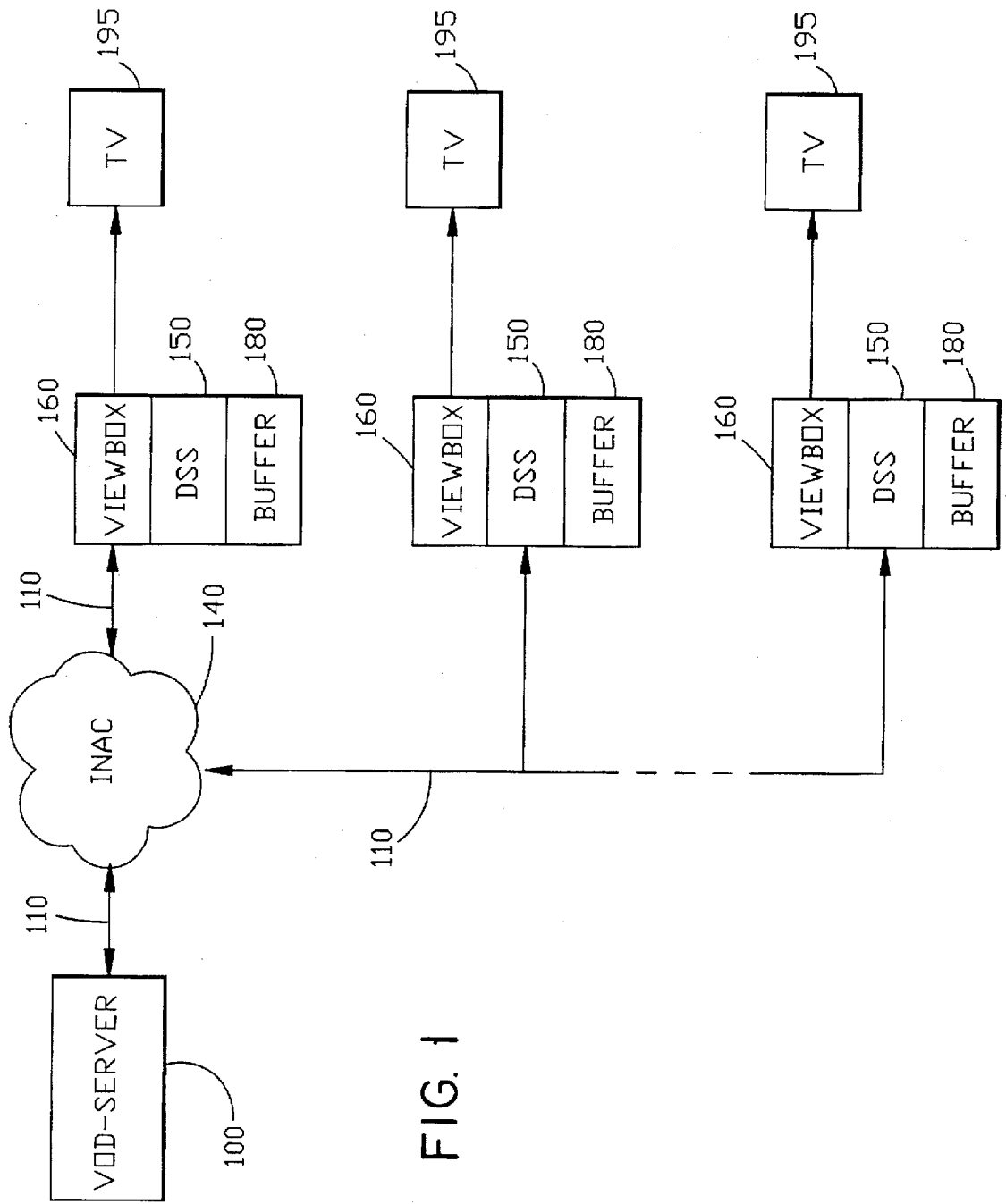
FIG. 1 is a block diagram of an embodiment of a fixed video-on-demand multimedia server system (FMSS) according to the present invention.

FIG. 1 illustrates an embodiment of a cable television signal distribution system, specifically a 'Fixed Video-on-Demand Multimedia Server System' (FMSS) according to the present invention. As is temporally illustrated in FIG. 2a, the system of the present invention is of a type commonly referred to as Near-video-on-demand (NVOD) wherein a video program is repeatedly made available at a staggered time interval Tstag. Returning now to FIG. 1, an NVOD system is transmitted from a VOD-server 100 on a plurality of channels coupled by transmission line 110 and interactive network and controller (INAC) 140 to a plurality of television receivers (TV) 195 through a viewbox 160 coupled between the INAC 140 and each TV 195.

Figure 5A:
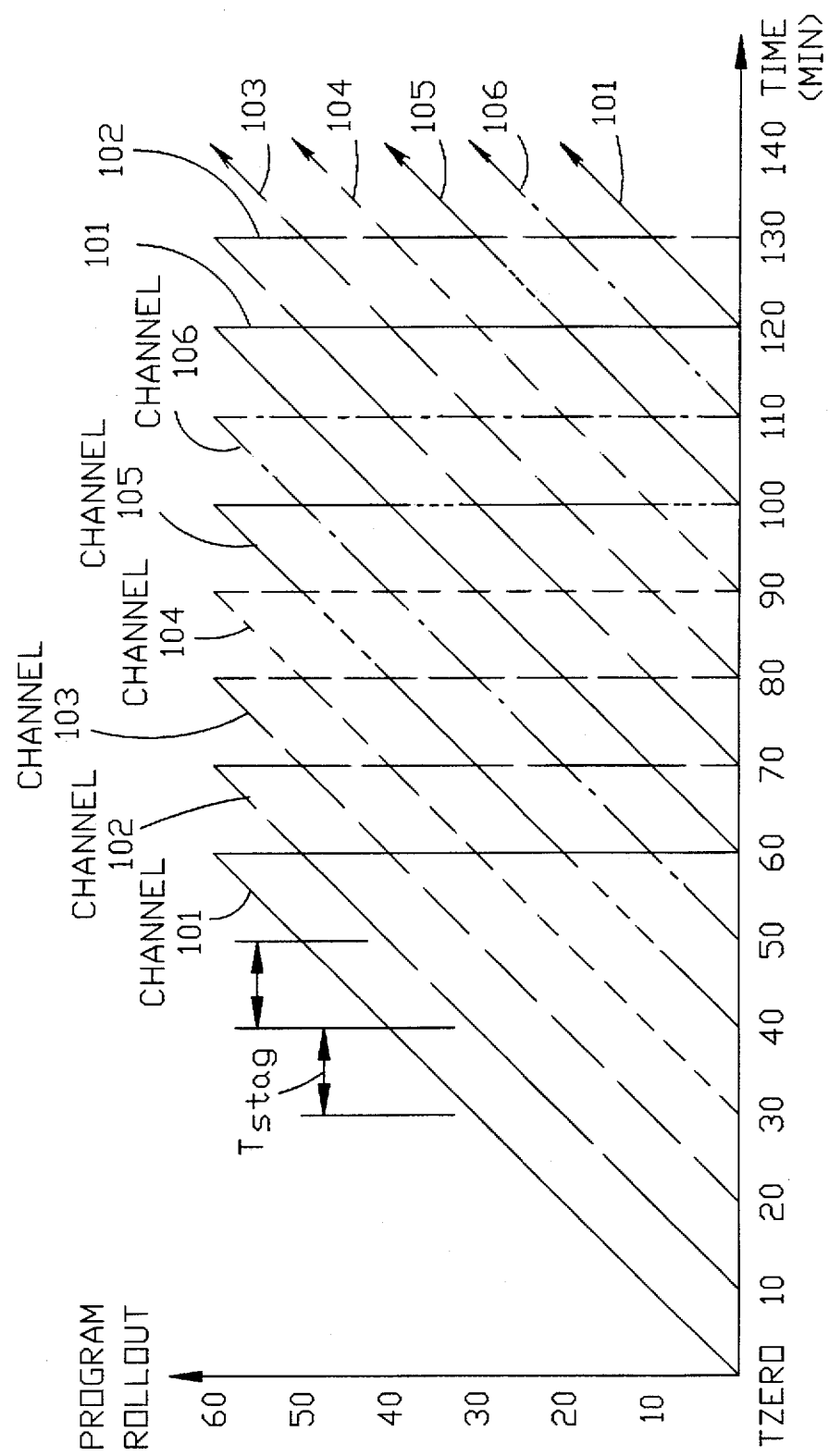
FIG. 5a is a timing diagram of a prior art Near-video-on-demand system (NVOD) of a type wherein a video program is repeatedly made available at a 10 minute staggered time interval adapted for use in a preferred embodiment according to the present invention.
Figure 5B:
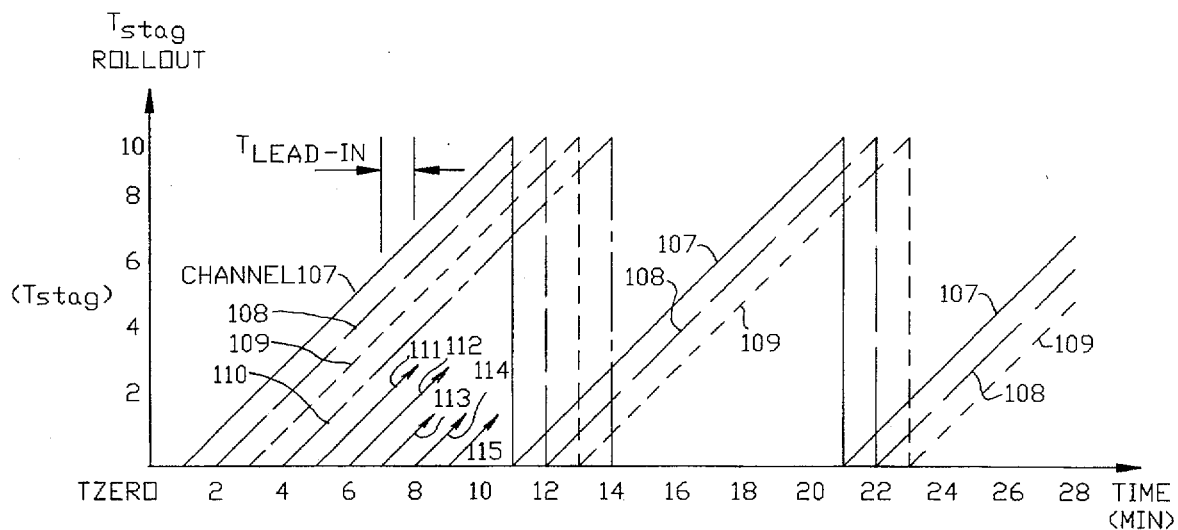
FIG. 5b is a timing diagram of an embodiment according to the present invention to be read concurrently with FIG. 5a illustrating the allocation of separate user channels at 1 minute staggered time intervals. Each channel contains a repeatedly transmitted beginning portion of each FVOD program.

Referring now to FIG. 5b, an embodiment of the present invention is shown wherein a fixed set of separate secondary channels of a duration equal to Tstag are allocated wherein each secondary channel contains a repeatedly transmitted beginning portion of each FVOD program. The start of each member of the fixed set of separate secondary channels is offset by a second staggered time interval $T_{lead-in}$. Preferably, a different member set is defined for each FVOD capable video program with each member transmitting on an independent channel. The number of members of the USER-CHAN set is equal to the stagger time interval Tstag divided by the lead-in time $T_{lead-in}$

USERCHAN=(Tstag)/($T_{lead-in}$).

The lead-in is such that any portion of it satisfies the apparent start of the user requested program. Thus, if the lead-in duration is $T_{lead-in}$ seconds, all FVOD users that make requests within $T_{lead-in}$ seconds will be served by the same USERCHAN. For example, if $T_{lead-in}$ is set at 10% of Tstag, there can be at most a requirement for 10 separate USERCHAN $120_1$–$120_{10}$ transmissions. The lead-in can be either specially prepared or the repetition of the starting video frame by zooming it in and out repeatedly. It may use techniques known to those skilled in the art to make a moving segment from a single or multiple frames.

Referring now to FIG. 2f, this number may be further decreased by one if a lead-in is also provided for each NVOD transmission. For example, if Tstag=10 minutes, and $T_{lead-in}$=1 minute (10% of Tstag) for each NVOD transmission, requires (10/1)−1=9, USERCHAN set members.

Returning now to FIG. 1, a buffer 180 is also associated with each viewbox 160 for storing the immediately previously commenced one of the NVOD programs associated with a request. Each viewbox is further associated with a dual selection and splicing mechanism (DSS) 150 for contiguously splicing the immediately previous transmission of the requested program to the conclusion of the beginning portion of the requested program for uninterrupted on-demand presentation to the requesting viewer on the TV 195.

In the following description, numerous well-known components are shown in block diagram form in order not to obscure the described inventive concepts in unnecessary detail. In other instances, specific details are provided in order that these inventive concepts may be clearly understood. It will be apparent to those skilled in the art that the described inventive concepts may be employed without use of these specific details and that the scope of the present invention is not limited by their disclosure.

Figure 4:
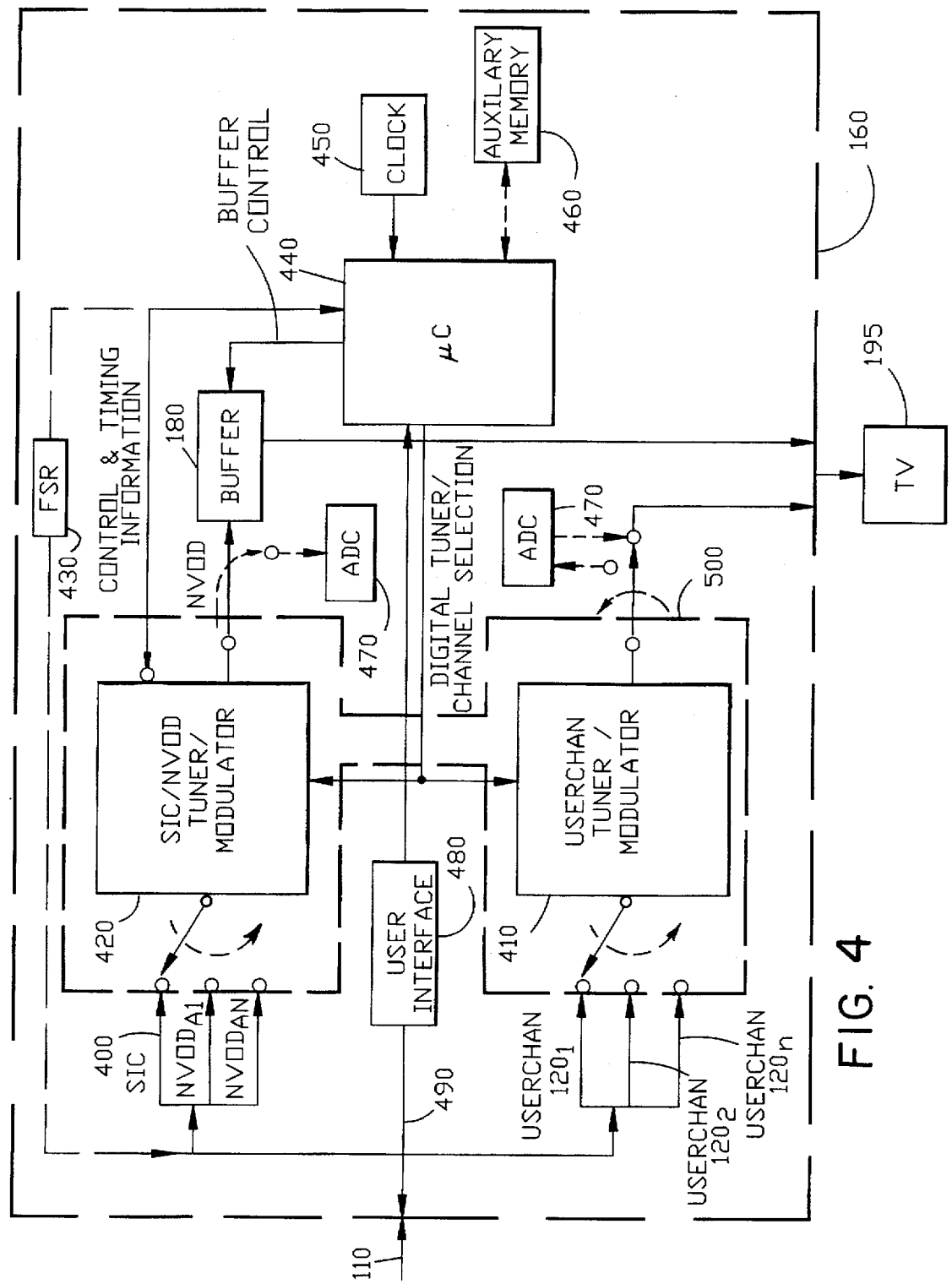
FIG. 4 is a schematic block diagram of a viewbox apparatus including a dual selection and splicing (DSS) mechanism according to an embodiment of the present invention.

The function of the viewbox apparatus 160 and the dual selection and splicing mechanism (DSS) 150 according to the present invention are depicted in FIG. 4. The transmission line 110 may include a dedicated channel called the Service Information Channel (SIC) 400 which is used by the VOD-server 100 to send the viewbox 160 a menu of programs available for user viewing. The SIC 400 preferably also carries program control information used by the viewbox 160, e.g., to determine which primary and secondary channels carry the signals needed for each program; the real clock starting time of each offering and the stagger interval therebetween, as well as a continuous transmission of the precise present time of day (preferably updated to fractional seconds) in order to synchronize the splicing of secondary and primary channel content for uninterrupted output by the viewbox 160. Those skilled in the art will appreciate that this embodiment of the present invention eliminates the need for interaction between the viewbox 160 and a return path to the VOD-server 100 is not needed to satisfy a program request since the viewbox 160 already has or can obtain all the information necessary (from the SIC 400) to quickly satisfy any and all VOD requests. Thus, communication setup delays are minimized.

In a preferred embodiment the DSS comprises a microcontroller 440. A microcontroller is a device that typically includes a microprocessor plus other associated circuitry such as random access memory (RAM) functions, serial input/output, and/or analog-to-digital conversion (ADC) capabilities. Accordingly, a microcontroller's functions could be performed by a microprocessor plus other external associated circuitry, but the term "microcontroller" is used herein because that is the term commonly used for such devices in commercial type viewboxes. The microcontroller 440 may be programmed by conventional means well known in the art to tune the SIC/NVOD tuner/modulator 420 to the SIC 400 channel in order to respond to and/or store the control, and/or timing information in the microcontroller's internal RAM (if of sufficient capacity), auxiliary memory 460 shown connected by dashed lines, or buffer 180. Alternatively, the control and/or timing signals could be transmitted during the vertical interval of the cable television signal by means well known in the art. For example, U.S. Pat. No. 4,222,068 discloses encoder means for inserting data signals into selected retrace lines of the vertical interval and decoder means responsive to these data signals and selectively enabled or disabled thereby.

The viewbox 160 may also include a userchan tuner/modulator 410, preferably under programmed control of microcontroller 440. Each viewbox may include a user interface 480 to allow users to perform conventional channel selection functions as well as input FVOD requests. Referring now to FIG. 2b assume an FVOD request is input at time Treq. Returning now to FIG. 4, the microcontroller 440, using programming information received via SIC 400, determines the request is asynchronous to the start of any NVOD transmission of the requested program and tunes userchan tuner/modulator 410 to the appropriate one of the fixed plurality of channels USERCHAN $120_1$-$120_n$ containing a beginning portion of the requested program. The userchan tuner/modulator 410 processes the signal by conventional techniques well known to those skilled in the art so that it can be displayed by TV 195. Those skilled in the art will also appreciate that the duration of the beginning portion may be less than or equal to Tstag and still be within the true spirit and scope of the invention.

Referring now to FIG. 2d, the microcontroller may also be programmed, based on the control and timing information obtained from the SIC 200, to tune the SIC/NVOD tuner/modulator to the immediately previous NVOD transmission and commence recirculatingly storing it in the buffer 180 at the conclusion of the current Tstag period. Preferably the buffer is of a type commonly known as a "hard drive". The microcontroller 440 may be programmed to commence reading the buffer 180 for output to the TV 195 at a point offset by Tstag from the input of the program request, i.e., Treq. Returning to FIG. 4, the microcontroller 440 is also programmed to simultaneously disconnect the userchan tuner/modulator 410 output to the TV 195, thereby effectively "splicing" the beginning portion of the requested program to the previously commenced NVOD transmission stored in the buffer for uninterrupted viewing on TV 195. Thereafter, the microcontroller is programmed to recirculatingly store to and read from the buffer 180 for the remainder of the previous NVOD transmission for output to the TV 195.

The timing synchronization required for the aforementioned splicing may be accomplished using the VOD-server generated precise present time of day, e.g., updated to 0.1 second increments, in conjunction with internal clock 450 which may be used to more precisely calculate the offset, e.g., milliseconds between receipt of the program request and the conclusion of the current Tstag period. It will be appreciated by those skilled in the art that there are several ways to splice the beginning portion to the NVOD portion without departing from the true spirit and scope of the invention.

For example, the MPEG standards have been developed by the Moving Picture Experts Group (MPEG), part of a joint technical committee of the International Standards Organization (ISO) and the International Electrotechnical Commission (IEC). The MPEG committee has been developing standards for the multiplexed, compressed representation of video and associated audio signals. Modern technology allows upwards of 26 MPEG-1 (1.5 Mb/s) programs and 12 MPEG-2 (3 Mb/s) programs to be transmitted on a single NTSC analog channel. Thus, tuning circuit 500 may comprise a single tuner capable of simultaneously receiving video/audio information corresponding to both the beginning portion of the program and the immediately previous NVOD transmission.

Thus, the FMSS provides VOD with fixed asset utilization in a very predictable way. It requires little or no setup to rapidly satisfy any and all VOD requests.

It is preferred that all NVOD transmissions of all available programs start at the same time and be provided with uniform stagger intervals Tstag. This allows the same channel SIC 400 to be used for all programs and for all times.

It will be appreciated by those skilled in the art that the present invention is adaptable to numerous combinations of analog or digital transmissions and/or topologies without departing from the true spirit and scope of the invention. For example, analog-TV-to-digital-TV converter (ADC) 470 (shown connected by dashed lines) can be incorporated to allow the use of analog signals on transmission line 110 in combination with the preferred "hard drive" buffer 180. In this case, tuning circuit could comprise analog mixers and detectors well known to those skilled in the art. Alternatively, buffer 180 could be an analog device. As an alternative to the use of SIC 400, the VOD-server may transmit appropriate signals containing an address portion thereby actuating a frequency signal keying (FSK) receiver 430 directing the signals to the microcontroller 440. The FSK 430 is shown connected by dashed lines. The microcontroller 440 may be programmed by conventional means well known in the art to perform the functions responsive to the instructions or timing information transmitted from the VOD-server to accomplish the aforementioned features of the present invention.

FIG. 3 illustrates an embodiment of a method according to the present invention of providing video-on-demand of the type wherein a VOD-server repeatedly transmits a video program to a viewbox at a staggered time interval Tstag over a plurality of primary channels in a transmission line. At step 410 a VOD-server repeatedly transmits to a viewbox a beginning portion of each video program over a plurality of secondary channels of a transmission line. The start of each beginning portion is offset by a fixed percentage of Tstag.

At step 420, the VOD-server makes available program control and timing information over the transmission line to each viewbox. At step 430, the user inputs a program request which is asynchronous to the start of any primary channel offering. At step 440, the viewbox uses the VOD-server transmitted menu, control, and timing information to: tune to a secondary channel containing the nearest not yet commenced beginning portion of the requested video program, for output by the viewbox; and concurrently tune to the immediately previously commenced primary channel containing the requested video program and store it in a buffer. The secondary channel may be served for a time equal to the NVOD stagger interval, Tstag. The buffer storage is preferably done in a recirculating manner in order to minimize the size of the buffer 180 required. When the buffer end (top) is reached, filling (STORE) is continued by overwriting the buffer 180 from its beginning (bottom). Buffer storage may commences offset from the immediately previous program start by an amount corresponding to Tstag from the actual start so as be contiguous with the conclusion of the secondary channel. The primary channel service connection is continued for the remaining duration of the program. Those skilled in the art will appreciate that although the preferred embodiment is described in terms of staggered time interval Tstag, the secondary channel service and buffer storage commencement could be minimized to $T_{tar}$, i.e., the tardiness of $T_{req}$ from the start of the previous (already in progress) primary channel transmission, without departing from the true spirit and scope of the invention.

At step 450, the viewbox uses the VOD-server transmitted menu, control, and timing and/or internal clock to terminates the secondary channel service connection at the conclusion of the beginning portion and starts reading the buffer out, so as to splice the stored video frames with the end of the secondary channel service, and thereafter continuously feed from the buffer for output by the viewbox until completion of the requested program. The READ is delayed from the STORE by a fixed interval $T_{DLY}$ equal to the tardiness of the user request from the start time of the immediately preceding program $NVOD_{A2}$ start. The remainder of the requested program $NVOD_{A2}$ is thus output for uninterrupted viewing by the user.

The preferred storage buffer size is for the buffer 180 to be large enough to store all the information contained during a stagger time interval Tstag. Thus, FVOD is provided using separate service at most for the duration of the stagger time interval Tstag of the previous NVOD transmission.

Those skilled in the art will appreciate that the FVOD can be supplied either by an NVOD service provider or by a value-added independent FVOD provider. The FVOD provider could modify and make use of the existing NVOD to satisfy the requirements of FVOD. This modification may include the creation and attachment of the lead-in to the received NVOD service and/or the repeatedly transmitted beginning portion of each FVOD program.

As an illustration of an embodiment in accordance with the present invention consider that, as shown in FIGS. 2e and 2f, each one of a plurality of programs is transmitted in its normal NVOd time slot separated by a stagger interval Tstag and that each NVOD transmission is further provided with a lead-in. This example assumes that TSTAG is 10 minutes, $T_{lead-in}$ is 1 minute—and the program duration is 1 hour. Referring now to FIG. 5a, it is further assumed that the entire program is provided on each of 6 channels, 101 to 106. Each channel starts the same program at a different 10 minute interval, so that Channel 101 has the program start at time T=TZERO;

Channel 102 has the program start at time T=TZERO+10 min;

Channel 103 has the program start at time T=TZERO+20 min;

Channel 104 has the program start at time T=TZERO+30 min;

Channel 105 has the program start at time T=TZERO+40 min;

Channel 106 has the program start at time T=TZERO+50 min;

Each of these channels repeats the one-hour program from the beginning as soon as it ends.

The VOD-server 100 would also provide the beginning portion of the program of duration Tstag repeatedly transmitted on separate secondary program channels. The Tstag portion is repeated by the VOD-server 100 over and over again on each of these channels. The program beginning (including the protracted video) on each secondary channel are delayed by $T_{lead-in}$ (1 minute) from each other. Referring now to FIG. 5b, 9 separate secondary channels would thus repeat the first 10 minute (Tstag) portion of the program over and over again, say on channels 107 to 115, so that

| CHANNEL | First 10 minutes commences at Time |
|---|---|
| 107 | T = ZERO + 1 minute |
| 108 | T = TZERO + 2 minutes |
| 109 | T = TZERO + 3 minutes |
| 107 | T = ZERO + 1 minute |
| 110 | T = TZERO + 4 minutes |
| 111 | T = TZERO + 5 minutes |
| 112 | T = TZERO + 6 minutes |
| 113 | T = TZERO + 7 minutes |
| 114 | T = TZERO + 8 minutes |
| 115 | T = TZERO + 9 minutes |

All these channels would continue their transmissions for the entire time that the provider is providing that program on FVOD. Other programs would be similarly provided on other channels. With this FVOD embodiment a user simply has to make a request for a program from a viewbox 160 provided menu. The viewbox 160 uses the DSS 150 synchronized to time T=TZERO. Thus the requesting viewbox 160 would tune to the channel that is showing the protracted video at the moment that the user makes the request for that program. Thus if the request coincides with:

| Time (minutes) | user would be tuned to channel |
|---|---|
| (TZERO) to (TZERO + 1) | 101 |
| (TZERO + 1) to (TZERO + 2) | 107 for Tstag and then 101 |
| (TZERO + 2) to (TZERO + 3) | 108 for Tstag and then 101 |
| (TZERO + 3) to (TZERO + 4) | 109 for Tstag and then 101 |
| (TZERO + 4) to (TZERO + 5) | 110 for Tstag and then 101 |
| (TZERO + 5) to (TZERO + 6) | 111 for Tstag and then 101 |
| (TZERO + 6) to (TZERO + 7) | 112 for Tstag and then 101 |
| (TZERO + 7) to (TZERO + 8) | 113 for Tstag and then 101 |
| (TZERO + 8) to (TZERO + 9) | 114 for Tstag and then 101 |
| (TZERO + 9) to (TZERO + 10) | 115 for Tstag and then 101 |
| (TZERO + 10) to (TZERO + 11) | 102 |
| (TZERO + 11) to (TZERO + 12) | 107 for Tstag and then 102 |
| (TZERO + 12) to (TZERO + 13) | 108 for Tstag and then 102 |
| (TZERO + 13) to (TZERO + 14) | 109 for Tstag and then 102 |
| (TZERO + 14) to (TZERO + 15) | 110 for Tstag and then 102 |
| (TZERO + 15) to (TZERO + 16) | 111 for Tstag and then 102 |
| (TZERO + 16) to (TZERO + 17) | 112 for Tstag and then 102 |
| (TZERO + 17) to (TZERO + 18) | 113 for Tstag and then 102 |
| (TZERO + 18) to (TZERO + 19) | 114 for Tstag and then 102 |
| (TZERO + 19) to (TZERO + 20) | 115 for Tstag and then 102 |
| (TZERO + 20) to (TZERO + 21) | 103 |
| (TZERO + 30) to (TZERO + 31) | 104 |
| (TZERO + 40) to (TZERO + 41) | 105 |
| (TZERO + 50) to (TZERO + 51) | 106 | and so on.

For all cases that use a secondary channel, the viewbox 160 uses the information available on the SIC 400 to store the immediately previous NVOD signal in the buffer 180 starting at a point immediately following the Tstag beginning portion. The viewbox 160 splices the stored NVOD to the end of the secondary channel Tstag program portion so as to feed the TV 195 with a continuous showing of the program requested. Thus there is no need for the use of a return path to interact with the VOD-server 100 in order to process the program request.

With FVOD all user VCR type control functions of STOP, CONTINUE, REWIND and FASTFORWARD are available by the Viewbox 160 jumping forward or behind its buffer memory and jumping to an earlier or later N-VOD provision than that which it is using.

From the above description of the preferred embodiments of the invention it will be apparent to those skilled in the art that numerous modifications and alterations may be made to the system and method of the present invention, other than those already described, without departing from the basic inventive concepts. For example, the process and system of the present invention is also useful for other server applications servicing a family of users on a single or multi-media provision. It uses FVOD as described only because it is expected to be the initial application of the present invention. All such modifications and alterations are to be considered within the scope of the present invention the nature of which is to be determined from the foregoing description and the appended claims.

Having thus described our invention, what we claim as new and desire to secure by Letters Patent is:

1. A method of providing video-on-demand of the type wherein a video program is repeatedly transmitted at a staggered time interval from a video-on-demand-server to a viewbox wherein the viewbox receives a request for the video program, the method comprising the steps of:

repeatedly transmitting a beginning portion of the video program from the video-on-demand-server to the viewbox at a second staggered time interval;

and at a receiver end:

selecting a next commenced beginning portion of the video program for output by the viewbox, responsive to the request for the video program;

selecting and storing an in-progress one of a plurality of repeated transmissions of the video program in a buffer associated with the viewbox, responsive to the request for the video program; and contiguously splicing an immediately previous transmission of the video program stored in the buffer, to a conclusion of the beginning portion of the video program, for output by the viewbox.

2. A method of providing video-on-demand as claimed in claim 1 wherein the beginning portion of the video program is of a duration equal to or greater than a delay of the request from a start of the in-progress transmission of the video program.

3. A method of providing video-on-demand as claimed in claim 1 wherein the beginning portion of the program is of a duration less than or equal to the staggered time interval.

4. A method of providing video-on-demand as claimed in claim 1 wherein the in-progress transmission is an immediately previous transmission of the video program.

5. A method of providing video-on-demand as claimed in claim 1 wherein storing the in-progress transmission in the buffer is done in a recirculating manner; and wherein the splicing step further comprises reading the in-progress transmission from the buffer in a recirculating manner.

6. A method of providing video-on-demand as claimed in claim 1 wherein the beginning portion of the video program further comprises a lead-in.

7. A method of providing video-on-demand as claimed in claim 1 wherein the video program repeatedly transmitted at a staggered time interval further comprises a lead-in.

8. A method of providing video-on-demand as claimed in claim 1 wherein the storing step commences at a point advanced from the start of the in-progress transmission of the video program by an amount equal to the duration of the beginning portion of the video program.

9. A method of providing video-on-demand as claimed in claim 1 further comprising the step of displaying the video program associated with the request on a display, responsive to the viewbox selecting the beginning portion of the video program for output.

10. A method of providing video-on-demand of the type wherein a video program is repeatedly transmitted at a staggered time interval and wherein a beginning portion of the video program is repeatedly transmitted at a second staggered time interval from a video-on-demand-server to a viewbox associated with a request for the video program, the method comprising the steps of:

at a receiver end:

selecting an in-progress one of the repeated transmissions of the video program and storing it in a buffer associated with the viewbox, responsive to the request for the video program;

selecting a next commenced beginning portion of the video program provided by the video-on-demand-server, for output by the viewbox; and contiguously splicing the in-progress transmission stored in the buffer to a conclusion of the beginning portion of the video program, for output by the viewbox.

11. A method as claimed in claim 10 wherein the beginning portion of the video program is equal to or greater than a duration of a delay of the request from the in-progress transmission of the video program and less than or equal to the staggered time interval.

12. A method as claimed in claim 10 wherein storing the in-progress transmission of the video program in the buffer is done in a recirculating manner; and wherein the splicing step further comprises reading the in-progress transmission of the video program stored in the buffer in a recirculating manner.

13. A method as claimed in claim 10 wherein the beginning portion of the video program associated with the request further comprises a lead-in.

14. A method as claimed in claim 10 wherein the video program repeatedly transmitted at a staggered time interval further comprises a lead-in.

15. A video-on-demand system of a type wherein a video program is repeatedly transmitted at a staggered time interval from a video-on-demand-server to a viewbox via a transmission line communicatively coupled therebetween wherein the viewbox Is responsive to the video-on-demand-server which receives a request for the video program, the system comprising:

at a head end:

the video-on-demand-server repeatedly transmitting a beginning portion of the video program from the video-on-demand-server to the viewbox;

and at a receiver end:

the viewbox having an input coupled to the transmission line and an output, the viewbox further including:

a tuning circuit having a first output, a second output, an input and a control point wherein the first output is switchably coupled to the output of the viewbox, the input being coupled to the input of the viewbox;

a remotely controlled switching device having a first output, a second output, and an input coupled to the input of the viewbox;

the second output of the remotely controlled switching device being coupled to the control point of the tuning circuit for switchably and adjustably selecting both a next commenced one of the beginning portions repeatedly transmitted from the video-on-demand-server and an in-progress one of the repeated transmissions of the video program associated with a request for the video program;

wherein the selected next commenced beginning portion of the video program is switchably coupled to the first output of the tuning circuit and the selected in-progress transmission of the video program is switchably coupled to the second output of the tuning circuit; and a buffer for storing the selected in-progress transmission of the video program;

the buffer including a first input, a second input, and an output wherein the output of the buffer is switchably coupled to the output of the viewbox, the second input of the buffer is coupled to the second output of the tuning circuit, and the first input of the buffer is coupled to the first output of the switching device;

wherein the remotely controlled switching device is further adapted for contiguously splicing the in-progress transmission of the video program stored in the buffer to the conclusion of the beginning portion of the video program.

16. A video-on-demand system as claimed in claim 15 wherein the remotely controlled switching device comprises a microcontroller.

17. A video-on-demand system as claimed in claim 15 wherein the beginning portion of the video program is of a duration equal to or greater than the delay of the request from a start of an immediately previous transmission of the video program.

18. A video-on-demand system as claimed in claim 15 wherein the beginning portion of the video program is of a duration less than or equal to the staggered time interval.

19. A video-on-demand system as claimed in claim 15 wherein the selected in-progress transmission is the immediately previous transmission of the video program.

20. A video-on-demand system as claimed in claim 15 wherein the remotely controlled switching device is adapted for recirculatingly storing to and reading from the buffer.

21. A video-on-demand system as claimed in claim 15 wherein the beginning portion of the video program associated with the request further comprises a lead-in.

22. A video-on-demand system as claimed in claim 15 wherein the video program repeatedly made available at a staggered time interval further comprises a lead-in.

23. A video-on-demand system as claimed in claim 15 wherein the processor is further adapted for storing the in-progress transmission of the video program in the buffer at a point advanced by an amount equal to the duration of the beginning portion of the video program.

24. A video-on-demand system of the type wherein a video program is repeatedly transmitted at a staggered time interval from a video-on-demand-server to a viewbox via a transmission line communicatively coupled therebetween, the system comprising:

at a head end:

means for repeatedly transmitting a beginning portion of the video program at a second staggered time interval; and at a receiver end:

means for selecting an in-progress one of the repeated transmissions of the video program and storing it in a buffer associated with the viewbox, responsive to a request for the video program;

means for selecting one of the repeatedly transmitted beginning portions of the video program, responsive to a request for the video program;

means for selecting one of the repeatedly transmitted beginning portions of the video program for output by the viewbox, responsive to the request for the video program; and means for contiguously splicing the in-progress transmission of the video program stored in the buffer to a conclusion of the beginning portion of the video program, for output by the viewbox.

25. A viewbox apparatus for use with a video-on-demand system of the type wherein a video program is repeatedly transmitted at a staggered time interval from a video-on-demand-server, comprising:

means for selecting an in-progress one of the repeated transmissions of the video program and storing it in a buffer, responsive to a request for the video program;

means for receiving from the video-on-demand-server a beginning portion of the video program repeatedly transmitted by the video-on-demand-server at a second staggered time interval, for output by the viewbox responsive to a request for the video program; and means for contiguously splicing the in-progress transmission of the video program stored in the buffer to a conclusion of the beginning portion of the video program stored in the buffer, for output by the viewbox.

26. A viewbox apparatus having an output and an input, the input being coupled to one end of a transmission line for receiving a video program in a video-on-demand system of a type wherein a video-on-demand-server coupled to an opposite end of the transmission line repeatedly transmits both a video program at a staggered time interval as well as a beginning portion of the video program at a second staggered time interval, the viewbox comprising:

a tuning circuit having a first output, a second output, an input and a control point wherein the first output is switchably coupled to the output of the viewbox, the input being coupled to the input of the viewbox;

a remotely controlled switching device having a first output, a second output, and an input coupled to the input of the viewbox;

the second output of the remotely controlled switching device being coupled to the control point of the tuning circuit for switchably and adjustably selecting both a next commenced one of the beginning portions of the video program and an in-progress one of the repeated transmissions of the video program associated with a request for the video program;

wherein the selected next commenced beginning portion of the video program is switchably coupled to the first output of the tuning circuit and the selected in-progress transmission of the video program is switchably coupled to the second output of the tuning circuit; and a buffer for storing the selected in-progress transmission of the video program;

the buffer including a first input, a second input, and an output wherein the output of the buffer is switchably coupled to the output of the viewbox, the second input of the buffer is coupled to the second output of the tuning circuit, and the first input of the buffer is coupled to the first output of the switching device;

wherein the remotely controlled switching device is further adapted for contiguously splicing the selected in-progress transmission of the video program stored in the buffer to a conclusion of the beginning portion of the video program.

27. A viewbox as claimed in claim 26 wherein the remotely controlled switching device comprises a microcontroller.

28. A viewbox as claimed in claim 26 wherein the beginning portion of the video program is equal to or greater than a duration of the delay of the request from a start of the in-progress transmission of the video program and less than or equal to the staggered time interval.

29. A viewbox as claimed in claim 26 wherein the remotely controlled switching device is adapted for recirculatingly storing to and reading from the buffer.

30. A viewbox as claimed in claim 26 wherein the viewbox comprises a display for viewing the video program.

31. A viewbox as claimed in claim 26 wherein the beginning portion of the video program further comprises a lead-in.

32. A viewbox as claimed in claim 26 wherein the video program repeatedly transmitted at a staggered time interval further comprises a lead-in.

* * * * *

UNITED STATES PATENT AND TRADEMARK OFFICE
CERTIFICATE OF CORRECTION

PATENT NO. : 5,724,646
DATED : March 3, 1998
INVENTOR(S) : Ganek et al.

It is certified that error appears in the above-identified patent and that said Letters Patent is hereby corrected as shown below:

On the title page, item [56] insert

In foreign Documents

Pct/WO/9211713,   7/9/92
Eu 06/33694A1,    7/7/94
Eu 05/94350A1,    10/13/93

Signed and Sealed this

Twentieth Day of April, 1999

Attest:

Q. TODD DICKINSON

Attesting Officer        Acting Commissioner of Patents and Trademarks